United States Patent
Nakajima et al.

(10) Patent No.: US 7,825,962 B2
(45) Date of Patent: Nov. 2, 2010

(54) IMAGE GENERATION WITH INTEGRATING CONTROL DATA

(75) Inventors: Yasumasa Nakajima, Nagano-ken (JP);
Kazunori Suenaga, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1667 days.

(21) Appl. No.: 10/467,496

(22) PCT Filed: Feb. 7, 2002

(86) PCT No.: PCT/JP02/01057

§ 371 (c)(1),
(2), (4) Date: Aug. 7, 2003

(87) PCT Pub. No.: WO02/065765

PCT Pub. Date: Aug. 22, 2002

(65) Prior Publication Data

US 2004/0075754 A1 Apr. 22, 2004

(30) Foreign Application Priority Data

Feb. 9, 2001 (JP) ............................ 2001-034522
Jun. 29, 2001 (JP) ............................ 2001-197822

(51) Int. Cl.
*H04N 5/76* (2006.01)
(52) U.S. Cl. ................. 348/231.6; 348/231.2
(58) Field of Classification Search ............ 348/231.99, 348/231.2, 231.3, 231.6, 239
See application file for complete search history.

(56) References Cited

U.S. PATENT DOCUMENTS

| 6,011,547 A | 1/2000 | Shiota et al. |
| 6,192,191 B1 | 2/2001 | Suga et al. |
| 6,273,535 B1 | 8/2001 | Inoue et al. |
| 6,539,169 B1 * | 3/2003 | Tsubaki et al. ............... 386/109 |

(Continued)

FOREIGN PATENT DOCUMENTS

EP     1 056 272     11/2000

(Continued)

OTHER PUBLICATIONS

English Translation of Japanese Patent Publication 2001-084361 to Maruyama et al publicshed Mar. 30, 2001.*

(Continued)

*Primary Examiner*—Sinh Tran
*Assistant Examiner*—Daniel M Pasiewicz
(74) *Attorney, Agent, or Firm*—Martine Penilla & Gencarella, LLP

(57) ABSTRACT

The technique of the present invention ensures flexible image processing that is performed integrally on a plurality of image data.

In accordance with the present invention, an image output system enables output of the image data, which is generated in a digital still camera DSC 12, with a color printer 20. The DSC 12 generates an image file, in which the image data, image processing control data and an additional data are stored. The image processing control data, which is preset by the manufacturer, may be specified regarding each image. The additional data is the user-configurable data, which is stored into the DSC. The color printer 20 performs image processing based on the image processing control data and the additional data, which is included in the image file, and outputs the resulting image.

4 Claims, 14 Drawing Sheets

U.S. PATENT DOCUMENTS

| | | | |
|---|---|---|---|
| 6,567,119 B1 * | 5/2003 | Parulski et al. | 348/207.2 |
| 6,597,468 B1 | 7/2003 | Inuiya | |
| 6,650,365 B1 * | 11/2003 | Sato | 348/231.3 |
| 6,728,428 B1 | 4/2004 | Kinjo | |
| 6,736,476 B2 | 5/2004 | Inoue et al. | |
| 6,771,889 B1 | 8/2004 | Suga et al. | |
| 6,785,814 B1 | 8/2004 | Usami et al. | |
| 6,822,678 B2 * | 11/2004 | Hatori | 348/231.99 |
| 6,822,758 B1 | 11/2004 | Morino | |
| 6,850,271 B1 * | 2/2005 | Ichikawa | 348/207.2 |
| 6,869,156 B2 | 3/2005 | Inoue et al. | |
| 7,360,852 B2 | 4/2008 | Inoue et al. | |
| 7,375,848 B2 | 5/2008 | Nakami et al. | |
| 7,403,696 B2 | 7/2008 | Suga et al. | |
| 7,533,949 B2 | 5/2009 | Inoue et al. | |
| 2001/0035909 A1 | 11/2001 | Kubo | |
| 2004/0260935 A1 | 12/2004 | Usami et al. | |

FOREIGN PATENT DOCUMENTS

| | | |
|---|---|---|
| EP | 1 241 870 | 9/2002 |
| JP | 05-292533 | 11/1993 |
| JP | 06-008537 | 1/1994 |
| JP | 08-315106 | 11/1996 |
| JP | 09-098373 | 4/1997 |
| JP | 10-174036 | 6/1998 |
| JP | 10-226139 | 8/1998 |
| JP | 11-041511 | 2/1999 |
| JP | 11-88672 | 3/1999 |
| JP | 11-098461 | 4/1999 |
| JP | 11-127415 | 5/1999 |
| JP | 11-239269 | 8/1999 |
| JP | 11-298848 | 10/1999 |
| JP | 11-308564 | 11/1999 |
| JP | 11-317863 | 11/1999 |
| JP | 2000-020691 | 1/2000 |
| JP | 2000-050043 | 2/2000 |
| JP | 2000-069277 | 3/2000 |
| JP | 2000-069419 | 3/2000 |
| JP | 2000-101884 | 4/2000 |
| JP | 2000-115688 | 4/2000 |
| JP | 2000-125186 | 4/2000 |
| JP | 2000-165720 | 6/2000 |
| JP | 2000-215379 | 8/2000 |
| JP | 2000-312296 | 11/2000 |
| JP | 2000-354255 | 12/2000 |
| JP | 2001084361 A * | 3/2001 |
| JP | 2001-147481 | 5/2001 |
| JP | 2003-060935 | 2/2003 |

OTHER PUBLICATIONS

Abstract of Japanese Patent Publication No. 10-334212, Pub. Date: Dec. 18, 1998, Patent Abstracts of Japan.
Abstract of Japanese Patent Publication No. 11-098461, Pub. Date: Apr. 9, 1999, Patent Abstracts of Japan.
Abstract of Japanese Patent Publication No. 11-308564 Pub. Date: Nov. 5, 1999, Patent Abstracts of Japan.
Abstract of Japanese Patent Publication No. 11-317863 Pub. Date: Nov. 16, 1999, Patent Abstracts of Japan.
Abstract of Japanese Patent Publication No. 2000-069277 Pub. Date: Mar. 3, 2000, Patent Abstracts of Japan.
Abstract of Japanese Patent Publication No. 2000-069419 Pub. Date: Mar. 3, 2000, Patent Abstracts of Japan.
Abstract of Japanese Patent Publication No. 2000-125186 Pub. Date: Apr. 28, 2000, Patent Abstracts of Japan.
Abstract of Japanese Patent Publication No. 2000-215379 Pub. Date: Apr. 4, 2000, Patent Abstracts of Japan.
Abstract of Japanese Patent Publication No. 2000-312296 Pub. Date: Nov. 7, 2000, Patent Abstracts of Japan.
Abstract of Japanese Patent Publication No. 2000-354255, Pub. Date: Dec. 19, 2000, Patent Abstracts of Japan.
Abstract of Japanese Patent Publication No. 11-239269, Pub. Date: Aug. 31, 1999, Patent Abstracts of Japan.
Abstract of Japanese Patent Publication No. 10-334212, Pub. Date: Dec. 18, 1998, Patent Abstracts of Japan.
Abstract of Japanese Patent Publication 11-88672, Pub. Date: Mar. 30, 1999, Patent Abstracts of Japan.
Abstract of Japanese Patent Publication 11-127415, Pub. Date: May 11, 1999, Patent Abstracts of Japan.
Abstract of Japanese Patent Publication 2000-115688, Pub. Date: Apr. 21, 2000, Patent Abstracts of Japan.
Abstract of Japanese Patent Publication No. 2001-147481, Pub. Date: May 29, 2001, Patent Abstracts of Japan.
Abstract of Japanese Patent Publication No. JP 05-292533, Pub. Date: Nov. 5, 1993, Patent Abstracts of Japan.
Abstract of Japanese Patent Publication No. JP 11-298848, Pub. Date: Oct. 29, 1999, Patent Abstracts of Japan.
Abstract of Japanese Patent Publication No. JP 2003-060935, Pub. Date: Feb. 28, 2003, Patent Abstracts of Japan.
Abstract of Japanese Patent Publication No. 06-008537, Pub. Date: Jan. 18, 1994, Patent Abstracts of Japan.
Abstract of Japanese Patent Publication No. 08-315106, Pub. Date: Nov. 29, 1996, Patent Abstracts of Japan.
Abstract of Japanese Patent Publication No. 2000-050043, Pub. Date: Feb. 18, 2000, Patent Abstracts of Japan.
Abstract of Japanese Patent Publication No. 2000-101884, Pub. Date: Apr. 7, 2000, Patent Abstracts of Japan.
Abstract of Japanese Patent Publication No. 2000-165720, Pub. Date: Jun. 16, 2000, Patent Abstracts of Japan.
Abstract of Japanese Patent Publication No. 10-174036, Pub. Date: Jun. 26, 1998, Patent Abstracts of Japan.
Abstract of Japanese Patent Publication No. 09-098373, Pub. Date: Apr. 8, 1997, Patent Abstracts of Japan.
Abstract of Japanese Patent Publication No. 10-226139, Pub. Date: Aug. 25, 1998, Patent Abstracts of Japan.
Abstract of Japanese Patent Publication No. 11-041511, Pub. Date: Feb. 12, 1999, Patent Abstracts of Japan.
Abstract of Japanese Patent Publication No. 2000-020691, Pub. Date: Jan. 21, 2000, Patent Abstracts of Japan.

* cited by examiner

Fig.5

| Preset No. | Set Value for Each Item | | | | | | | Suitable Scene |
|---|---|---|---|---|---|---|---|---|
| | Contrast | Brightness | Color Balance | Saturation | Sharpness | Registered Color | Noise Removal | |
| Preset 1 | Standard | Standard | Standard | Standard | Standard | OFF | OFF | Standard |
| Preset 2 | Slightly Lower | Slightly Brighter | Standard | Sligtly Lower | Slightly Lower | Flesh Color | OFF | Portrait |
| Preset 3 | Slightly Higher | Standard | Standard | Slightly Higher | Slightly Higher | Skyblue, Green | OFF | Landscape |
| Preset 4 | Standard | Dark | OFF | Standard | Slightly Lower | Red | ON | Sunset |
| Preset 5 | Standard | Dark | OFF | Standard | Standard | OFF | ON | Night View |
| Preset 6 | Slightly Lower | Slightly Brighter | Low | Slightly Higher | Standard | Green | OFF | Flower |
| Preset 7 | Standard | Standard | Low | Standard | High | OFF | OFF | Macro |
| Preset 8 | Hard | Standard | Standard | Slightly Higher | High | OFF | OFF | Sports |
| Preset 9 | Slightly Lower | Bright | Standard | Standard | Standard | OFF | OFF | Backlight |
| Preset 10 | Standard | Standard | Standard | High | Slightly Higher | Red | OFF | Autumn |
| Preset 11 | Standard | Slightly Brighter | Standard | Standard | Slightly Higher | Flesh Color | OFF | Ceremonial Photograph |

| Offset | Description |
|---|---|
| 0 | Maker Name 00x0 |
| 6 | Reserve |
| 8 | Number of Local Tag Entries |
| 10 | Local Tag 1 |
| 22 | PrintMatching |
| ... | ... |
| 10+12*(N-1) | Local Tag N |

} 104

(b)

| Offset | Description |
|---|---|
| 0 | PrintMatching Identifier |
| 8 | PIM Version Information |
| 12 | Reserve |
| 14 | Number of Specified Parameters |
| 16 | First Parameter No. |
| 18 | First Parameter Setting Value |
| 22 | Second Parameter No. |
| 24 | Second Parameter Setting Value |
| 28 | Third Parameter No. |
| 30 | Third Parameter Setting Value |
| ... | ... |
| 16+6*(n-1) | n-th Parameter No. |
| 18+6*(n-1) | n-th Parameter Setting Value |

Fig.8

Second Image Processing Control Data (Additional Data)

| Item | Parameter Value |
|---|---|
| Gamma Value | 2.2 |
| Color Space | NTSC |
| Contrast | Standard |
| Brightness | Standard |
| Color Balance | Standard |
| Saturation | Standard |
| Sharpness | Standard |
| Registered Color | OFF |
| Noise Removal | ON |

First Image Processing Control Data

| Item | Parameter Value |
|---|---|
| Gamma Value | 2.2 |
| Color Space | NTSC |
| Contrast | Standard |
| Brightness | Standard |
| Color Balance | Low |
| Saturation | Standard |
| Sharpness | Hard |
| Registered Color | OFF |
| Noise Removal | OFF |

Fig.9

| | Tag Name | Parameter Value |
|---|---|---|
| First Image Processing Control Data | Gamma Value | 2.2 |
| | Color Space | NTSC |
| | Contrast | Standard |
| | Brightness | Standard |
| | Color Balance | Low |
| | Saturation | Standard |
| | Sharpness | Hard |
| | Registered Color | OFF |
| | Noise Removal | OFF |
| Additional Data | Gamma Value | 2.2 |
| | Color Space | NTSC |
| | Contrast | Standard |
| | Brightness | Standard |
| | Color Balance | Standard |
| | Saturation | Standard |
| | Sharpness | Standard |
| | Registered Color | OFF |
| | Noise Removal | ON |

Fig.10

| Tag Name | Parameter Value |
|---|---|
| Gamma Value | 2.2 |
| Color Space | NTSC |
| Contrast | Standard |
| Brightness | Standard |
| Color Balance | Low |
| Saturation | Standard |
| Sharpness | Hard |
| Registered Color | OFF |
| Noise Removal | ON |

IMAGE GENERATION WITH INTEGRATING CONTROL DATA

TECHNICAL FIELD

The present invention relates to a technique of generating an image file, in which image data and image processing control data are associated one another, and performing image processing on the image file.

BACKGROUND ART

A digital still camera (DSC) is configured to record an image in the digital data format using a CCD. A liquid crystal display mounted on the DSC allows a photographer to view and delete images that have been shot. One applicable procedure utilizing a general-purpose personal computer is output of image data that has been shot by the DSC, such as displaying on a monitor and printing with a printer.

Each DSC, however, has different characteristic in the color brightness or the color tone of a subject corresponding to manufacturer and a type of a device. The difference in the characteristics also occurs depending on a type of an image output device. In many cases, intentions of the photographer are not reflected on resulting output images due to those differences.

Furthermore, preferences are varied from user to user. Actualizing ideal characteristic of the color reproduction on the DSC and the printer does not always means that it is suitable for the preference of the user. The user is thus required to retouch the image data individually in order to obtain suitable output image for his or her preference. Under some output environments and user preferences, adjusting the picture quality in a uniform manner is required for a plurality of image data. For example, when the output environment tends to cause the output image to be bluish, the user is required to apply uniform processing to respective image data in order to control a bluish color according to his or her preference. In general, adjustment of the image data is labor-consuming, and thus imposes a great burden when being performed for each image data.

Those problems were described herein exemplifying the DSC; however, similar problems arise in an image data generation apparatus, such as a digital video camera and a scanner.

The object of the present invention is thus to provide a technique that ensures flexible image processing on a plurality of image data integrally.

DISCLOSURE OF THE INVENTION

To attain at least part of the above and the other related objects, the present invention adopts the following structure.

In accordance with one aspect of the present invention, a first image file generation apparatus that generates an image file, in which image data and image processing control data are associated one another, wherein the image processing control data is used for image processing of the image data, comprises:

an image data generation module that generates the image data;

an image processing control data acquisition module that acquires a plurality of the image processing control data; and an image file generation module that integrates the plurality of the image processing control data, and thereby generates the image file, in which a resulting image processing control data and the image data are associated one another.

The image data may be, for example, newly generated by shooting with a camera or scanning with a scanner, or extracted from the image file that has been generated in any format. In one available example, the image file, in which the image data and the image processing control data are associated one another, is input to generate the image data by deleting the image processing control data therein.

In accordance with the present invention, the image file generation apparatus enables generation of the image file, in which the image data and the image processing control data are associated one another. Association may includes two forms; both data are integrally included and respective data is included in different files formally, in which a piece of information for associating both data one another is included in at least one of two files. The term "include" or "associate" in the specification means the former form in a narrow sense, and both the former and the latter forms in a broad sense. The image file in the Exif format includes, for example, both a storage area for the image data and a storage area for the additional data. This type of format enables the image processing control data to be stored into the storage area for the additional data.

The "image processing control data" herein is data for controlling the image processing that is performed on the image data by an image processing device. The image processing device functions to analyze this image processing control data and automatically set parameters for the image processing to be performed. This parameter, for example, includes parameters regarding "the contrast", "the brightness", "the color balance", "the saturation", "the sharpness", "the gamma value" and "the target color space". "The target color space" is a parameter that specifies the color space used for the image processing, based on the color space, such as sRGB color space or a NTSC, which has been employed relating to generation of the image data.

The image file of the present invention integrally includes the plurality of the image processing control data. Using a diversity of combinations of those image processing control data thus achieves flexible image processing. The term "integrate" includes two forms of integration; respective image processing control data are combined in a not-identifiable form and respective image processing control data are associated one another in an identifiable form.

A variety of embodiments are applied for acquiring the plurality of the image processing control data.

Three embodiments discussed below may be adopted for acquiring the image processing control data respectively from two image processing control data storage modules, each of which stores different types of the image processing control data with a different object therein.

In accordance with the first embodiment, the first image file generation apparatus of the present invention further comprises:

a first image processing control data storage module that stores first image processing control data that is preset; and a second image processing control data storage module that stores second image processing control data being settable, wherein the image processing control data acquisition module acquires the first image processing control data and the second image processing control data from the first image processing control data storage module and the second image processing control data storage module, respectively.

In the first embodiment, the first image processing control data storage module stores the first image processing control data, which has been preset. The second image processing control data storage module stores the second image processing control data that is settable or editable later. For example, the first image processing control data may be manufacturer-supplied data set on a device, and the second image processing control data, on the other hand, may be user-configurable data. This application enables the image processing employing both the first image processing control data, which has been preset, and the second image processing control data, which has been set later, integrally.

In accordance with the second embodiment of the present invention, the first image file generation apparatus of the present invention further comprises:
- a first image processing control data storage module that stores a first image processing control data being variable corresponding to image data; and
- a second image processing control data storage module that stores a second image processing control data being common to a plurality of image data,
- wherein the image processing control data acquisition module acquires the first image processing control data and the second image processing control data from the first image processing control data storage module and the second image processing control data storage module, respectively.

The first image processing control data being variable corresponding to the image data may includes shooting conditions on a DSC for generating the image data, such as the shutter speed, the aperture and the white balance. In addition, the image processing control data, which is associated with a type of the image data, such as "Portrait" and "landscape". The second image processing control data is used for integrally providing the plurality of the image data with common image processing. For example, the image processing control data for controlling blue color may be employed as the second image processing control data under output circumstances where output of the image is required to be less bluish.

In accordance with the third embodiment of the present invention, the first image file generation apparatus of the present invention further comprises:
- a first image processing control data storage module that stores a first image processing control data being unable to be edited by the user; and
- a second image processing control data storage module that stores a second image processing control data being user-configurable,
- wherein the image processing control data acquisition module acquires the first image processing control data and the second image processing control data from the first image processing control data storage module and the second image processing control data storage module, respectively.

In this embodiment, the first image processing control data is unable to be edited by the user. In other words, any arbitrary setting is not allowed for the user. For example, the first image processing control data is provided by the manufacture of the image file generation apparatus. The user selectively uses the first image processing control data among data provided in advance.

The second image processing control data is, on the other hand, the user-configurable data. In other words, the user is allowed for arbitrary setting. Employing the image processing recommended by the manufacturer in combination with the image processing set by the manufacture enables a variety of processing.

In accordance with those three embodiments as discussed, the image processing control data is not restricted to two types, but may be other types to be used integrally.

For example, the second image processing control data storage module may store a plurality of the second image processing control data that correspond to a plurality of image output devices capable of utilizing the image processing control data.

In some cases, the characteristic of the color reproduction becomes different among image output devices even though an identical image data is to be output. In this embodiment, using suitable second image processing control data for each image output device causes less difference in the color reproduction.

In accordance with another aspect of the present invention, the first image file generation apparatus that includes the above first and the second image processing control data storages, further comprises:
- a judgment module that judges as to whether or not using the second image processing control data,
- wherein the image file generation module integrates the first image processing control data with the second image processing control data when the judgment module decides to use the second image processing control data, and thereby generates an image file, including a resulting image processing control data and the image data integrally.

The image file generation module, on the other hand, may generate the image file without using the second image processing control data only when the judgment module decides not to use the second image processing control data.

This application enables the second image processing control data to be used selectively, and thereby generates the image file. The judgment as to whether or not using the second image processing control data may be performed based on the user instruction.

In accordance with the first image file generation apparatus of the present invention, the resulting image processing control data may be the data, in which a plurality of the image processing control data are combined one another.

The term "combine" means obtaining a single set of image processing control data that prevents identification of the plurality of the image processing control data. This application includes that, for example, a specific computation of original image processing control data generates new image processing control data, with effects of respective original image processing control data integrated.

In accordance with the first image file generation apparatus of the present invention, the resulting image processing control data may be made up of the plurality of the image processing control data that are associated one another.

The resulting image processing control data of this type enables the identification of respective image processing control data prior to integration, and thereby performs flexible processing on the image file after being generated. One available example is separating the plurality of the image processing control data included in the image file, and thereby changing the combination and deleting unnecessary data.

The present invention is also directed to a second image file generation apparatus that generates an image file, in which image data and image processing control data are associated one another, wherein the image processing control data being used for image processing of the image data. The second image file generation apparatus comprises:

an image file input module that inputs an original image file, in which the image data and the first image processing control data are associated one another;

a second image processing control data storage module that stores a second image processing control data; and an image file generation module that integrates the first image processing control data with the second image processing control data, and thereby generates the image file, in which a resulting image processing control data and the image data are associated one another.

This application enables the second image processing control data to be added to the original image file, in which the resulting image data and the first image processing control data are associated one another. The flexible image processing is thus achieved.

In accordance with another aspect of the second image file generation apparatus, the image file input module inputs the plurality of the original image files. The second image file generation apparatus further comprises:

a selection module that selects a target original image file among the plurality of original image files, wherein the image file generation module integrates the first image processing control data included in the target original image file with the second image processing control data, respectively, and thereby generates the image files, in each of which the resulting image processing control data and the image data are associated one another.

This application enables the second image processing control data to be added to the target original image.

The user may arbitrarily specify individual original image file. In another example of this application, the original image file to be input may include information relating to generation of the image data, and the selection module may select the original image file to be processed, based on the information.

The information regarding the generation of the image data herein includes a piece of information, such as the date and the condition of the generation, and the comment by a photographer of the image data. The image file in the Exif format, as described previously, has a function of storing such information into a storage area for an additional data. When the information relating to the generation of those image data is included in the original image file, the specific original image file may be selected among the plurality of the original image files by searching.

In accordance with the second image file generation apparatus of the present invention, the selection module may select the target original image file, based on the first image processing control module included in the original image file. This application enables the specific original image file, which includes the specific image processing control data, to be selected among the plurality of the original image files by searching.

In accordance with yet another aspect of the present invention, the second image file generation apparatus further comprises:

an edit information input module that inputs edit information for editing the first image processing control data, wherein the image file generation module further reflects the edit information on the first image processing control data.

This application enables both editing the first image processing control data and adding the new image processing control data integrally.

The present invention is also directed to a third image file generation apparatus that generates an image file, in which image data and image processing control data are associated one another, wherein the image processing control data being used for image processing of the image data. The third image file generation apparatus comprises:

an image file input module that inputs an original image file, in which a plurality of image processing control data being separable and the image data are associated one another; and an image file generation module that invalidates part of the plurality of the image processing control data, and generates an image file, in which the image data and valid part of the image processing control data are associated one another.

This application enables the image processing control data, which is judged as unnecessary by the user among the plurality of the image processing control data, to be invalid. The term "invalid" includes delete and setting zero to the image processing control data, and causing the image processing control data to be disabled without changing the data itself.

The image file generation apparatus of the present invention is available for a diversity of image data generation devices, such as a digital camera. The digital camera may be a DSC or a digital video camera.

The present invention is also directed to a image data processing device.

In accordance with one aspect of the present invention, a first image processing device that performs specific image processing on image data, comprises:

an image file input module that inputs an image file, in which the image data and first image processing control data used for image processing on the image data;

a second image processing control data storage module that stores second image processing control data; and an image processing module that performs the specific image processing on the image data, based on the first image processing control data and the second image processing control data.

The second image processing control data is similar to that of the image file generation apparatus as discussed previously. In accordance with the first image processing device, this application enables flexible image processing based on the first image processing control data and the second image processing control data that is stored into the image processing device.

In accordance with another aspect of the present invention, a second image processing device that performs specific image processing on the image data, comprises:

an image file input module that inputs an image file, in which the image data and a plurality of image processing control data being separable that is used for image processing on the image data;

an image processing module that performs the specific image processing on the image data, based on part of the plurality of the image processing control data.

This application prevents an application of unnecessary image processing control data.

In accordance with the present invention, the image processing device may be applied for a diversity of the image output devices, such as a color printer. Another available example includes a monitor, such as a CRT display and a liquid crystal display.

In addition to the image file generation apparatus and the image processing device as discussed previously, the technique of the present invention may be actualized by an image file generation method and an image processing method. The technique of the present invention is further achieved by a computer program attaining such a method, and a recording medium in which such a computer program is recorded. The various additions and modifications described above are applicable to any of these embodiments.

When the technique of the present invention is attained by a computer program or a recording medium in which such a computer program is recorded, the computer program may be the whole program for driving the image file generation apparatus and the image file generation apparatus or only the partial program for attaining the characterized functions of the present invention. Typical examples of the recording medium include flexible disks, CD-ROMs, magneto-optic discs, IC cards, ROM cartridges, internal storage devices (memories like a RAM and a ROM) and external storage devices of the computer, and a variety of other computer readable media.

BRIEF DESCRIPTION OF THE DRAWINGS

FIG. 5 is an explanatory diagram illustrating parameters of image processing control data and detail of set-up;

FIG. 7 shows the detail hierarchical structure of an image file 100;

FIG. 8 is an exemplified schematic diagram illustrating a first image processing control data and an additional data;

FIG. 9 is a schematic diagram illustrating one example of the data stored into a MakerNote data storage area 103;

FIG. 10 is a general schematic diagram illustrating one example of the data conceptually, in which the image processing control data and the additional data are integrally stored into a MakerNote data storage area 103;

BEST MODES OF CARRYING OUT THE INVENTION

Figure 1:
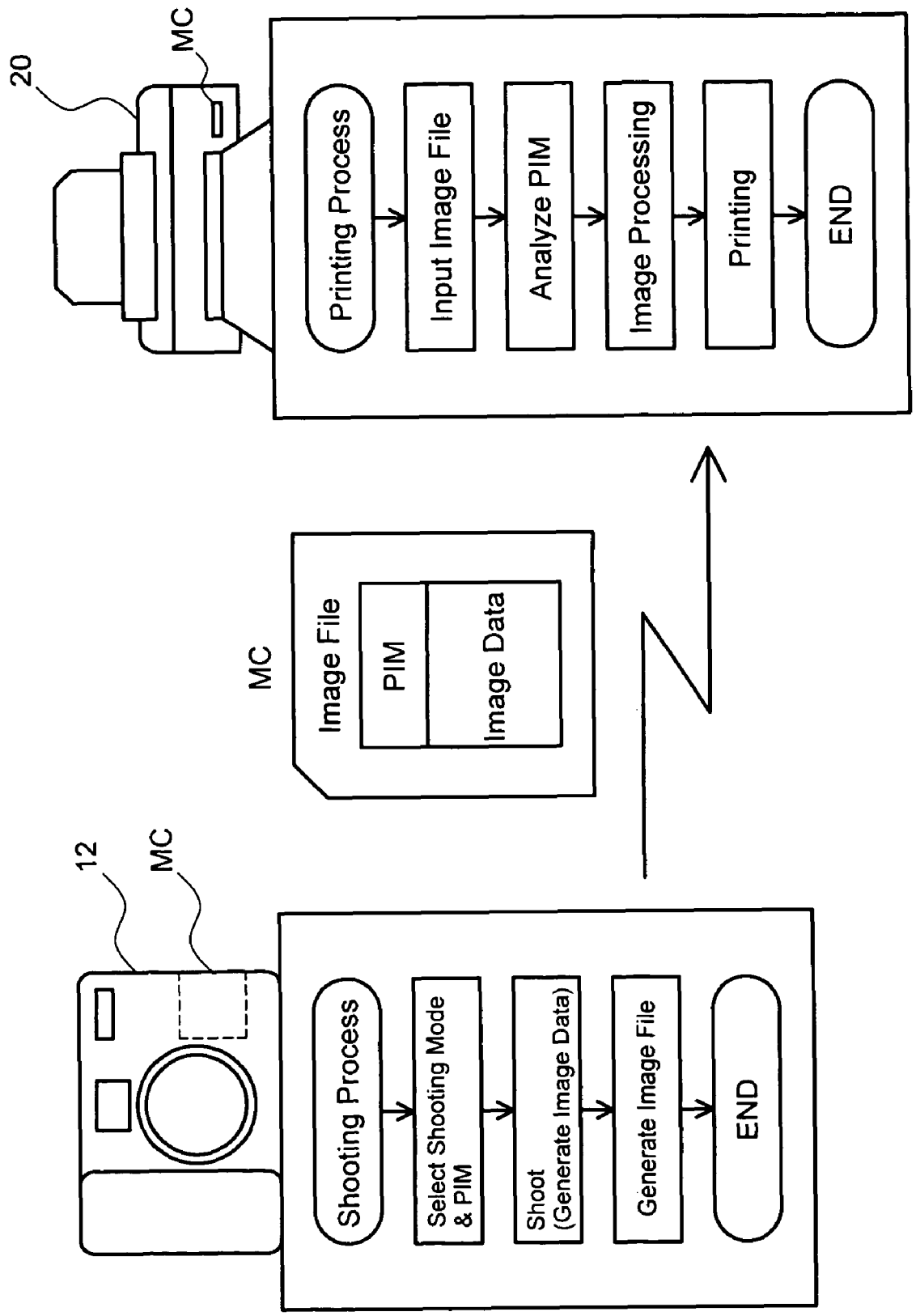
FIG. 1 schematically illustrates the construction of an image output system 10.

Some modes of carrying out the invention are discussed below as embodiments in the following order:
A. Construction of Image Output System
B. Image File Generation Apparatus
C. Structure of Image File
D. Generation of Image File (First Embodiment)
E. Generation of Image File (Second Embodiment)
F. Generation of Image File (Third Embodiment)
G. Image Output Device
H. Image Processing on Image Output Device
I. Image Output Device (Fourth Embodiment)
J. Modifications A. Construction of Image Output System FIG. 1 schematically illustrates the construction of an image output system in one embodiment of the present invention. The image output system 10 of the prevent invention includes a DSC 12 and a color printer 20. The DSC 12 is used as an image file generation apparatus. The color printer 20 is used as an image processing device and an image output device.

The DSC 12 functions to set various shooting conditions and output control data PIM. Available example of the shooting condition includes the condition for acquiring the image data, such as the shutter speed, exposure and aperture. The output control data PIM is data required to control image processing and printing with the color printer 20, and includes image processing control data used for the image processing and a print command. The DSC 12 does the shooting under the shooting condition, which is set by the user, and generates an image file, in which the image data and the output control data PIM are integrally included. A resulting image file is stored into a memory card MC.

The color printer 20 has a function of image processing. The color printer 20 receives input of the image file via the memory card MC or a cable, and then analyzes the output control data PIM. The color printer 20 performs the image processing on the image data, based on the image processing control data, which is included in the output control data PIM, and thereby executes the printing.

As mentioned above, the image output system 10 in accordance with the present invention controls the printing with the color printer 20 to execute the printing that reflects the intention of the photographer. The details about the DSC, the image file and the color printer will be discussed below.

Figure 2:
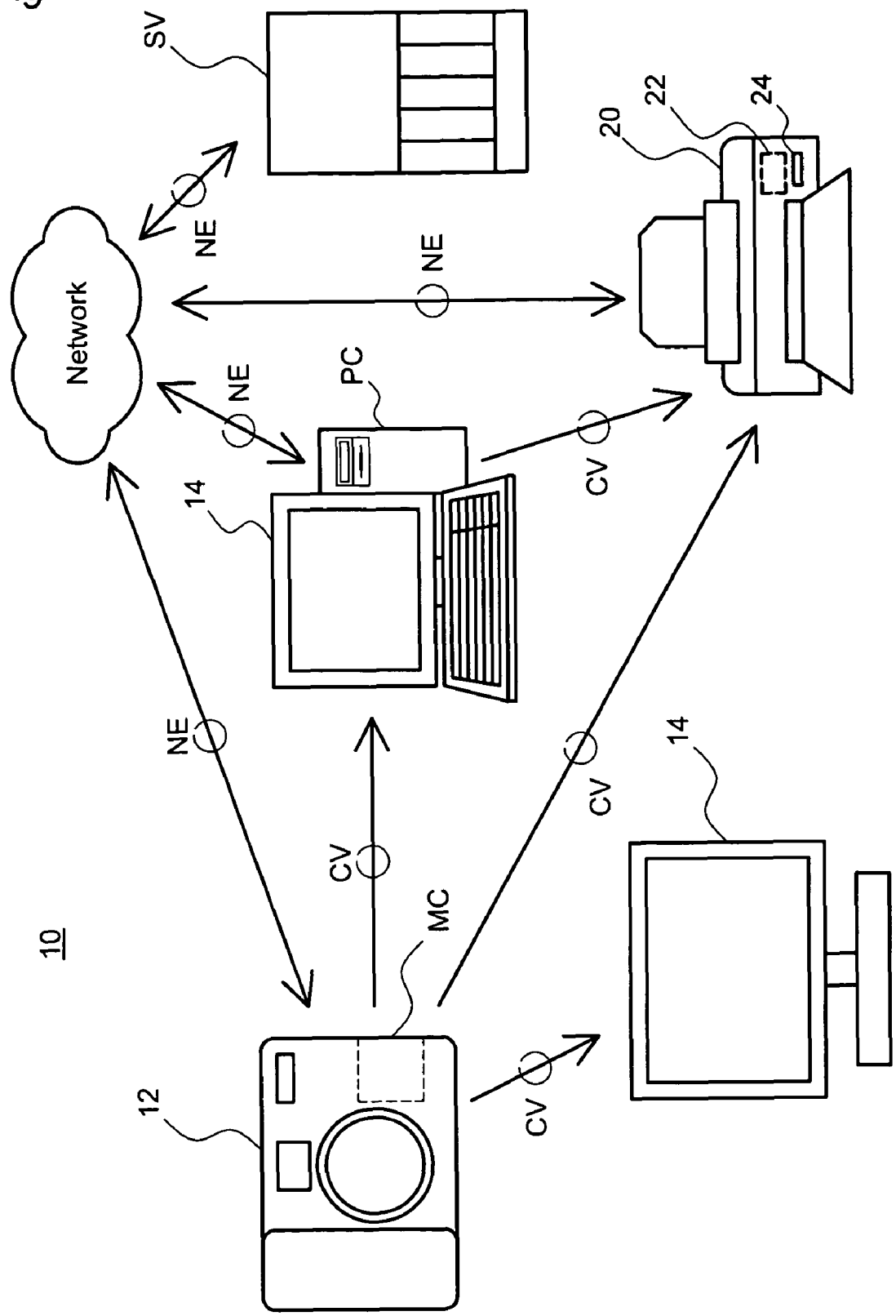
FIG. 2 shows modifications of an image output system 10.

A diversity of embodiments may be applied to the image output system 10. FIG. 2 shows modifications of the image output system 10. The image output system 10 may include a personal computer PC incorporating a function of the image processing, a server SV and a monitor 14 used as the image output device. A scanner and a digital video camera may also be connected to the system as the image file generation apparatus. Respective devices are connected together with a cable CV or a wireless communication locally or via a network NE in order to receive data. The DSC 12 includes an image data generation module 12a.

B. Image File Generation Apparatus

Figure 3:
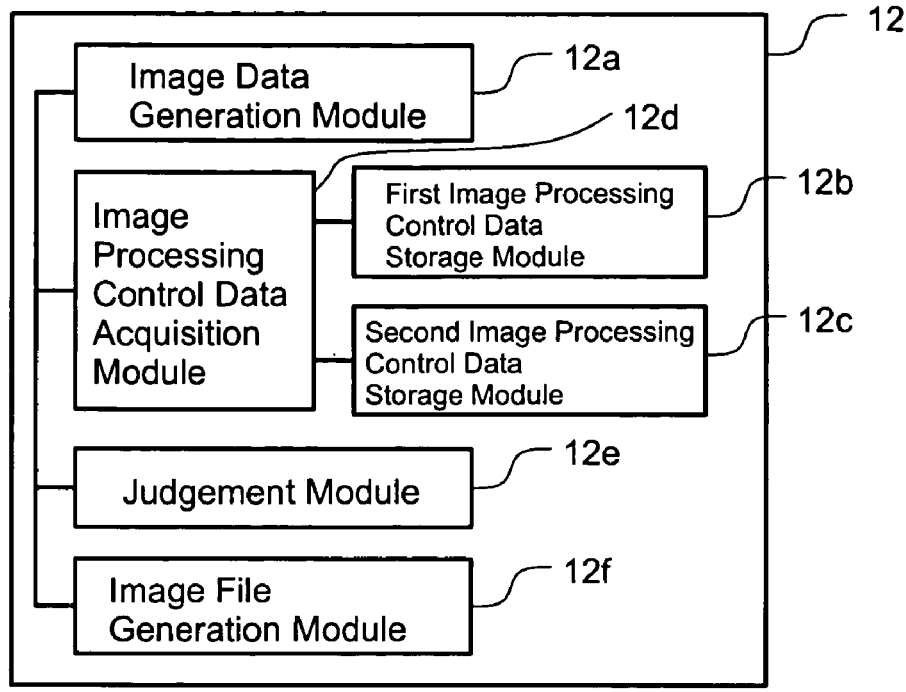
FIG. 3 shows functional blocks of a DSC 12.

FIG. 3 shows functional blocks of the DSC 12. The respective functional blocks are actualized by software or hardware configuration.

A first image processing control data storage module 12b stores first image processing control data that is varied corresponding to the image data, which has been preset by the manufacturer of the DSC 12. A second image processing control data storage module 12c stores the image processing control data that is common to a plurality of the image data, which is user-configurable data. For example, where the user always has the intention to obtain the output of the image with less bluish, a second image processing control data is set in a manner of reducing blue. In this embodiment, the second image processing control data is herein called "additional data" in the sense of being added to the first image processing control data.

Both the first image processing control data and the additional data may be prepared by the manufacturer or the user. It is available to change over more than two image processing control data corresponding to the purpose.

Image processing control data acquisition module 12d functions to acquire the image processing control data from an external storage device, such as a hard disk of the personal computer PC, the server SV, and any recording medium.

An image file generation module 12f functions to generate the image file, in which the image processing control data and the image data are stored in a specific format. In this embodiment, the first image processing control data and the additional data are stored into the file, which are associated one another. The first image processing control data and the additional data thus are stored in a distinct and detachable status.

A judgment module 12e functions to judge whether or not using the additional data in generating the image file. In one example, the user may instruct whether or not using the additional data, by means of operation of the input unit that is mounted on the DSC 12. In the case that no additional data is used, the image file, in which the image data and the first image processing control data are included, is then generated.

Figure 4:
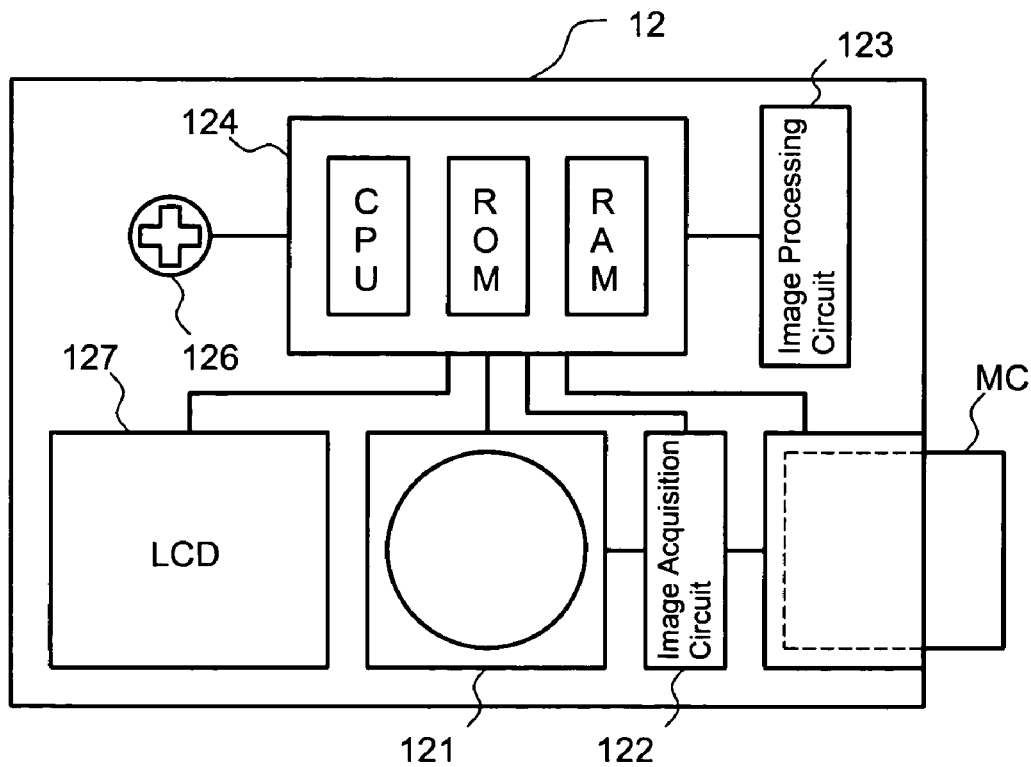
FIG. 4 is a block diagram illustrating the schematic structure of a DSC 12.

FIG. 4 is a block diagram illustrating the schematic structure of the DSC 12. The DSC 12 does the shooting with a CCD or a photomultiplier. The DSC 12 includes an optical circuit 121 having the CCD, an image acquisition circuit 122 controlling the optical circuit 121, an image processing circuit 123 causing the acquired digital image to be processed and a control circuit 124 having a CPU, ROM and RAM, which controls respective circuits.

The DSC 12 stores the acquired image into the memory card MC as the digital data. A typical format for storing the image data is JPEG. Any other formats, such as TIFF, GIF and BMP, are also available.

The DSC 12 has a Select/Set-up Button 126 for various settings regarding the shooting mode and the image processing control data, and a liquid crystal display 127 for displaying an image preview window and a set-up window of every kind.

The "shooting mode" is a group of parameters, which is set corresponding to the shooting scene. This parameter, for example, includes parameters regarding the exposure time, the white balance, the aperture, the shutter speed and the focal length of lens or the like. Once the user selects the shooting mode, respective parameter values are automatically set corresponding to the selected shooting scene.

"The image processing control data" is data regarding the output of the image, such as the contrast and the brightness, which is used for the image processing in the color printer 20. In this embodiment, plural sets of the image processing control data are preset corresponding to the shooting mode.

FIG. 5 is an explanatory diagram illustrating parameters of the image processing control data. In this embodiment, eleven sets of parameters are preset by the manufacturer of the DSC 12 corresponding to shooting scenes. Each set includes seven items of parameters, that is, "the contrast", "the brightness", "the color balance", "the saturation", "the sharpness", "the registered color" and "the noise removal". The DSC 12 generates the image file, in which the additional data, the image processing control data selected by the user and the image data are integrally included, and then stores the resulting image file into the memory card MC. In addition to those data, the image file includes the gamma value of the DSC 12, the target color space and the shooting condition, such as the exposure time, the white balance, the aperture, the shutter speed and the focal length of lens or the like. The parameter applied for each shooting mode is recorded in ROM in the control circuit 124.

C. Structure of Image File

Figure 6:
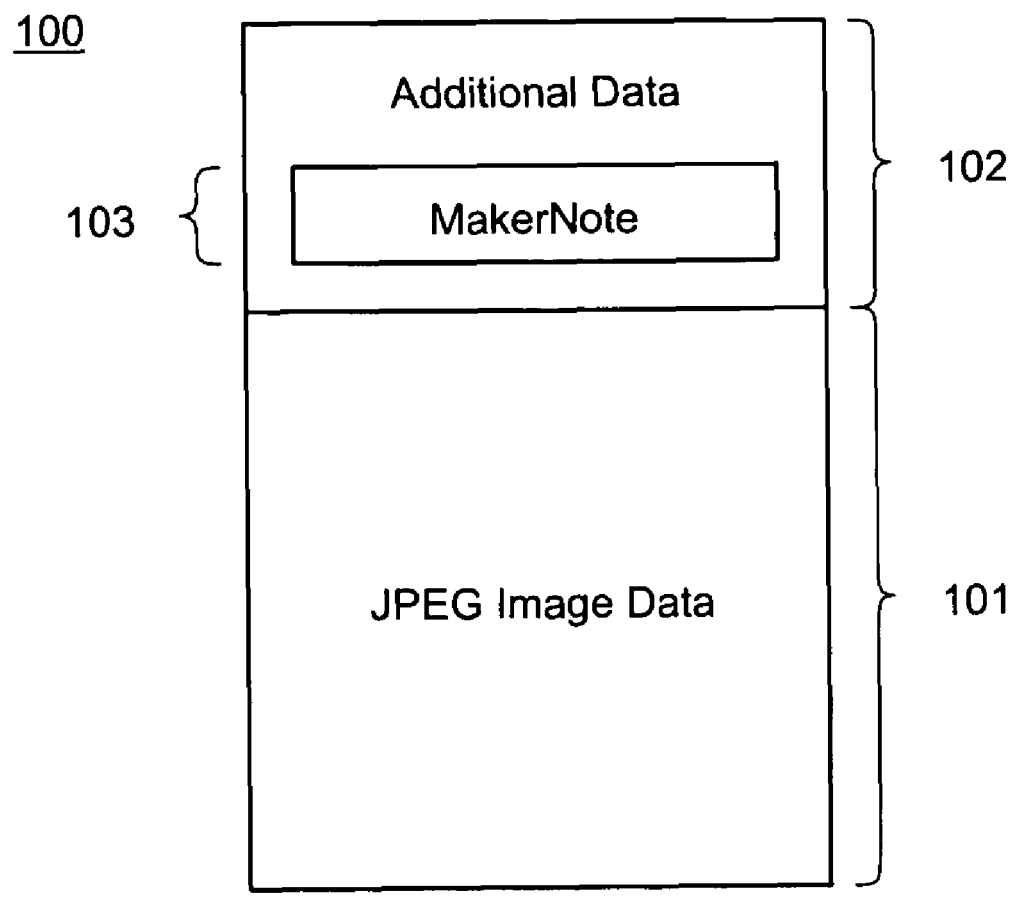
FIG. 6 generally shows one example of the structure of an image file 100.

FIG. 6 shows the structure of an image file 100. According to this embodiment, the image file 100 adopts a specific file structure in conformity with the Exif (Exchangeable Image File) format standard for DSC. The Exif file specification was established by JEITA (Japan Electronics and Information Technology industries Association).

The image file 100 includes an image data storage area 101 and an additional information storage area 102. The image data is stored into the image data storage area 101 in the JPEG format. The additional information is stored into the additional information storage area 102 in the TIFF format. The additional information storage area 102 includes a MakerNote data storage area 103. The MakerNote data storage area 103 is undefined area left open to the manufacturer of the DSC 12. The image processing control data is stored into the MakerNote data storage area 103.

As known among those skilled in the art, the file in the Exif format has a data structure that utilizes a tag in order to specify each data. "MakerNote" is allocated to the data stored into the MakerNote data storage area 103 as a tag name, which is called a MakerNote tag.

Although the image file 100 is regarded as the file in the Exif format in this embodiment, it is not restricted to this format. The image file may have a data structure, in which the image data and the image processing control data are associated in any available format. The image data and the image processing control data may be integrally included in one file as shown in this embodiment, or may be formally included in different files. In the latter structure, at least one of both data preferably includes information that associates one another.

FIG. 7 shows the detail hierarchical structure of the image file 100. FIG. 7(a) shows the data structure of the MakerNote data storage area 103. FIG. 7(b) shows the data structure of a PrintMatching data storage area 104, which is defined in the MakerNote data storage area 103. PrintMatching data is used as the image processing control data.

The data stored into the MakerNote data storage area 103 may be identified with the tag. The PrintMatching tag is allocated to the image processing control data. Each tag in the MakerNote data storage area 103 is specified with the pointer based on an off-set value from the top address in the MakerNote data storage area 103. Pieces of information regarding a name of the manufacturer (6 bites), a reservation area (2 bites), the number of the entries in the local tag and offset of each local tag (12 bites) are sequentially stored into the MakerNote data storage area 103. The end code "00x0", which represents the end of the data, follows the name of the manufacturer.

An identifier PrintMatching in the PrintMatching data storage area 104 indicates that the parameter PrintMatching is stored. A parameter specification number indicates how many parameters are specified. A parameter specification number stores the value that specifies (identifies) the parameter number allocated to each parameter in advance. Information regarding a set-up value of the parameter includes set-up value of the parameter corresponding to the specified parameter number. In one example, the parameter number is data stored into a 2-byte area, while the set-up value of the parameter is data stored into a 4-byte area. The image output device may acquire the image processing control data by utilizing the PrintMatching tag as an index.

FIG. 8 is an exemplified schematic diagram illustrating the first image processing control data and the additional data. "The first image processing control data" and "the second image processing control data" are hereinafter referred to as "the image processing control data" and "the additional data", respectively.

The image processing control data includes the gamma value of the DSC 12, the color space and the preset data as shown in FIG. 5. The data, which is set by the user, is used as the additional data. FIG. 9 is a schematic diagram illustrating one example of the data stored into the MakerNote data storage area 103. As shown in FIG. 9, the image processing control data and the additional data, shown in FIG. 8, are stored into the MakerNote data storage area 103 in an identifiable format. It should be understood that the above description is conceptual data structure.

The data stored into the MakerNote data storage area 103 shown in FIG. 9 may be generated by combining the image processing control data with the additional data, shown in FIG. 8. FIG. 10 is a general schematic diagram illustrating one example of the data conceptually, in which the image processing control data and the additional data are combined together and stored into the MakerNote data storage area 103. The image processing control data and the additional data may be combined in conformity with the prescribed specification. For example, where both the image processing control data and the additional data include identical parameter values regarding the same tag, that parameter is to be adopted. Otherwise, the parameter other than default value is to be adopted. In one example of FIG. 10, respective default values are set to: "Gamma=2.2", "Color Space=NTSC", "Contrast=Standard", "Brightness=Standard", "Color Balance=Standard", "Saturation=Standard", "Sharpness=Standard", "Registered Color=OFF" and "Noise Removal=OFF". As shown in FIG. 8, both the image processing control data and the additional data have identical parameters regarding "Gamma value", "Color Space", "Contrast", "Brightness", "Saturation" and "Registered Color", which are to be adopted in the combined image processing control data. On the other hand, both have different parameters regarding "Color Balance", "Sharpness" and "Noise Removal", where other parameters than default values, that is, "Low", "Hard" and "ON", are adopted as parameters, respectively.

D. Generation of Image File

First Embodiment

Figure 11:
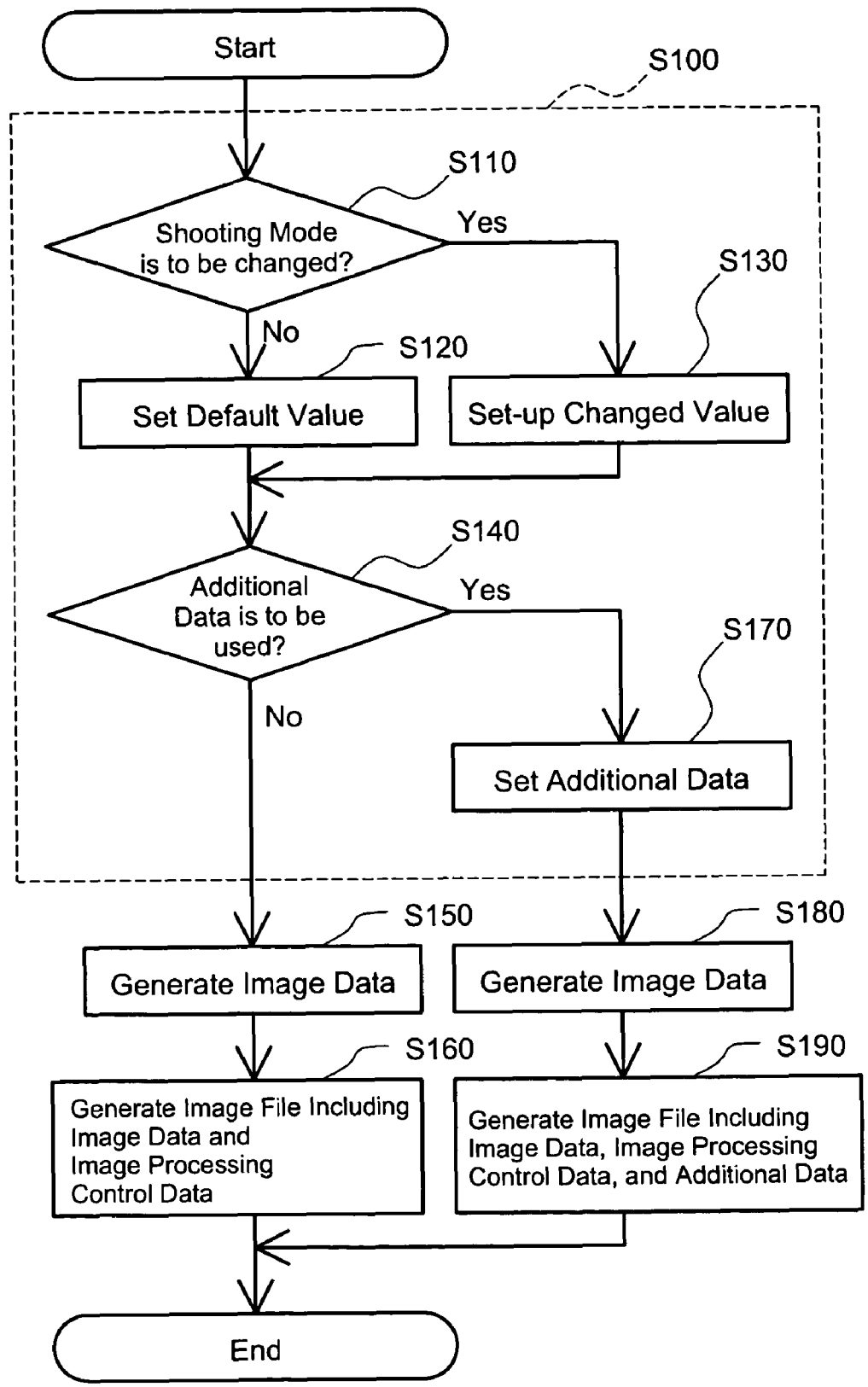
FIG. 11 is a flowchart illustrating the process of generating the image file 100 in a DSC 12 in accordance with the first embodiment.

FIG. 11 is a flowchart illustrating the process of generating the image file 100 in the DSC 12 in accordance with the first embodiment. The photographer sets the condition as to whether or not using the additional data and the shooting mode prior to a shoot (step S100). The shooting mode is selected among default shooting modes, which are displayed on the liquid crystal display 127, with the operation of the Select/Set-up button 126 (steps S110 and S130). A "full automatic mode", which allows the DSC 12 to perform set-up of the additional data at the time of the shoot regardless of the selected shooting mode, and a "manual mode", which allows the photographer to perform set-up in manual according to his or her preference, are also prepared. Once the shooting mode is set, each data preset for the image processing control data in FIG. 5 is automatically selected. If no set-up is performed at this step, the default value is adopted (step S120).

Then, the condition, as to whether or not using the additional data, is set with the operation of the Select/Set-up button 126 (step S140). When the additional data is employed, the additional data is read out from the memory and is set in any suitable format for the process of the generation of the image file (step S170).

Although the present invention is attained by adopting the user set-up data as one example of the additional data in this embodiment, it is not restrictive but may also be attained by employing various types of data as the additional data in view of the image processing control data that is "settable or editable later", "common among a plurality of the image data" and "settable by the user". The image processing control data, which is settable later, is used as the data that is adaptive for addition or modification with the user operation or the like after a device is released. In one example, the image processing control data that is common among a plurality of image data is used for reducing blue in the output of the image constantly where less bluish color is desired for each output according to the user preference and the characteristic of the device. Furthermore, it is available to preset the additional data based on the characteristic in the color reproduction of the image output device corresponding to the type of the device.

The control circuit 124 generates the image data in response to a shooting request, such as push of a shutter button, based on the parameter value corresponding to the shooting mode (steps S150 and S180). At step S140, when receiving input that indicates the additional data is not to be used, the control circuit 124 generates the image file 100, in which the image data and the image processing control data are included (step S160). When receiving input that indicates the additional data is to be used, the control circuit 124 generates the image file 100, in which the image processing control data associated with the additional data are stored (step S190). Finally, the control circuit 124 stores the resulting image file 100 into the memory card MC and then terminates the process of the generation.

With a sequence of the above process, the image processing control data, which has been set by the photographer, may be stored into the image file 100, which is recorded in the memory card MC. Conventional image processing control data, which is set based on general specification, does not always include parameters suitable for preference of all users while the technique of the present invention allows the data to be added based on the user preference, and thus attains the image processing corresponding to the user preference and output of the image.

Although the image processing control data in this embodiment is set corresponding to set-up of the shooting mode, it is also available to store the preset data in associated with an image processing mode regardless of the shooting mode, which enables the shooting mode and the image processing mode to be set independently.

Furthermore, the set-up of the shooting mode and the use of the additional data at step 100 are not limited to one shoot (the generation of one image file) as shown in the above embodiment, but may be valid by the time of changeover or reset.

E. Generation of Image File

Second Embodiment

In the first embodiment, the image file, in which the image processing control data and the additional data are included, is generated in the process of the shoot. Alternatively, the additional data may be added to the image file after the shoot. The image file may be generated by overwriting or invalidating the additional data, which is originally included in the image file. In accordance with the second embodiment, the DSC has an image file input module that inputs an original image file including a resulting image data and the image processing control data in addition to respective functions shown in FIG. 3.

Figure 12:
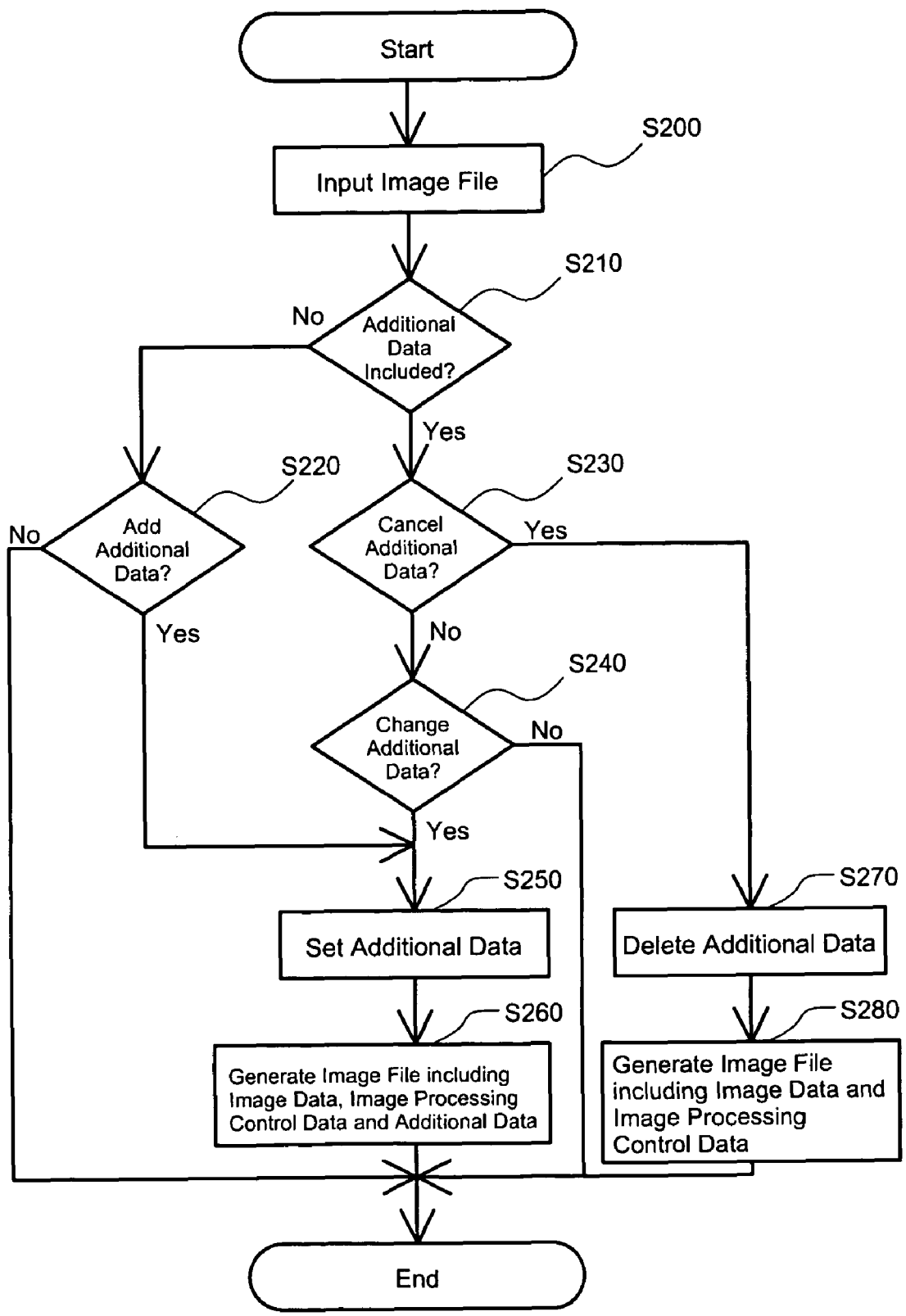
FIG. 12 is a flowchart illustrating the process of generating the image file 100 in a DSC 12 in accordance with the second embodiment.

FIG. 12 is a flowchart illustrating the process of generating the image file 100 in accordance with the second embodiment. The control circuit 124 first inputs the image file (step S200). At this step, analysis is performed as to whether or not the input image file includes the additional data (step S 210). As shown in FIG. 9, when the image processing control data and the additional data are stored into the image file in an identifiable format, it is judged that the additional data is included. As shown in FIG. 10, when the image processing control data and the additional data are not stored into the image file in the identifiable format, it is judged that the additional data is not included.

When the image file includes the additional data, the judgment is performed as to whether or not canceling that additional data (step S230). One available example includes an input unit mounted on the DSC 12 in order to input the status of the additional data; ON or OFF. In the case of canceling the additional data, the additional data regarding the image file is deleted (step S270), the image file, which includes the image processing control data and the image data, is generated (step S280), and then the process of the generation of the image file is terminated. When not deleting the additional data at step S230, the judgment is performed whether or not overwriting the existing additional data (step S240). If not, the processing is terminated. When overwriting the existing additional data, new additional data is set (step S250), and the image file, in which the image data and the image processing control data associated with the new additional data are stored (step S260). The new additional data overwrites the existing additional data.

When the additional data is not included in the image file at step S210, the judgment is performed as to whether or not adding the additional data (step S220). If not, the processing is terminated. When additional data is determined to be added, the additional data is set (step S250), and the image file, in which the image processing control data associated with the additional data are stored, is generated.

In accordance with the second embodiment, the image file may be generated by setting whether or not the additional data is employed on the existing image file. Namely, when the additional data is originally included in the image file, the additional data may be invalidated and overwritten. If not, the additional data may be added to the image file.

Although the generation of the image file is processed on the DSC 12 in this embodiment, it is not restricted but may be processed, for example, on the personal computer PC with the similar functional specification.

F. Generation of Image File

Third Embodiment

Figure 13:
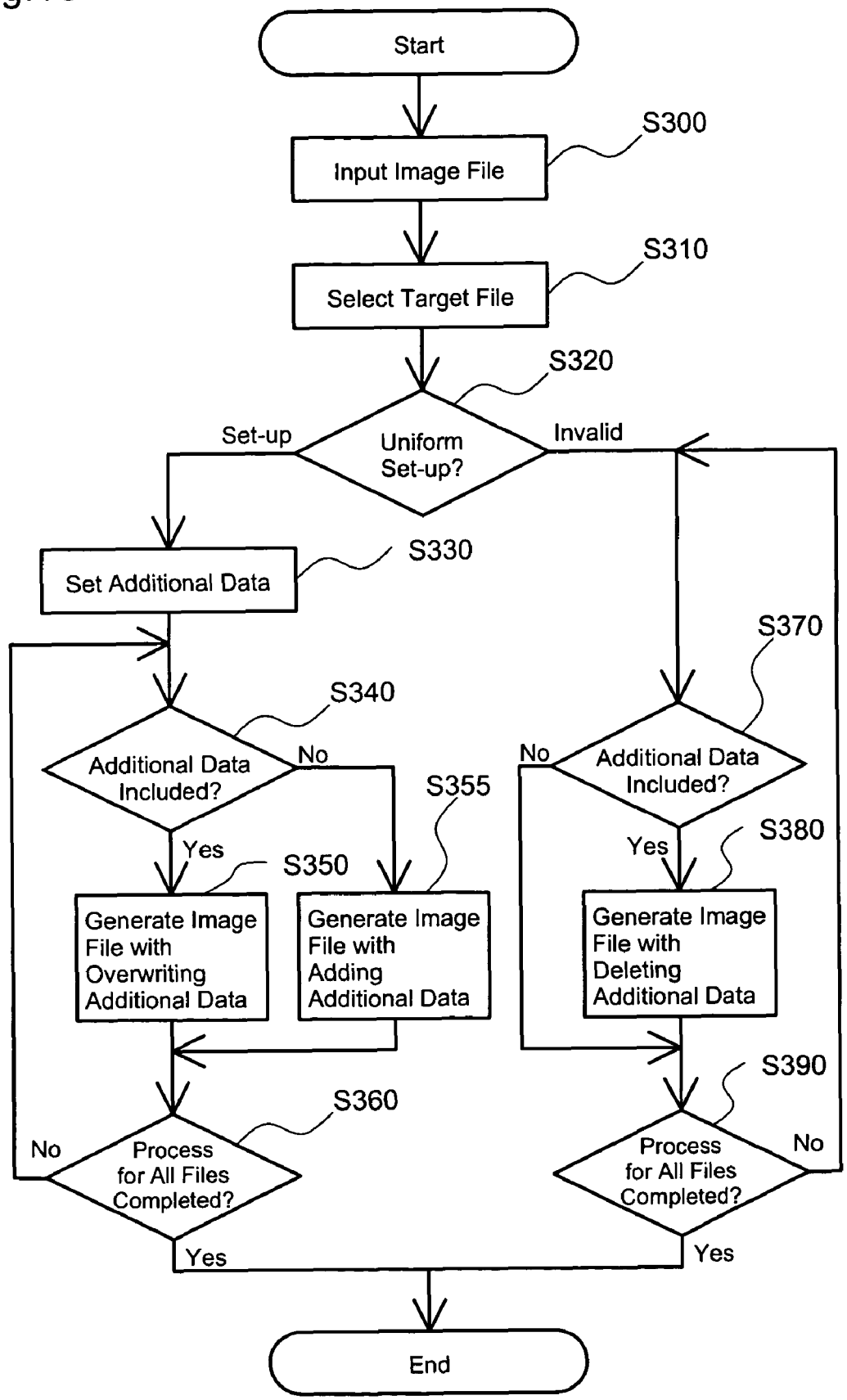
FIG. 13 is a flowchart illustrating the process of generating the image file 100 in a DSC 12 in accordance with the third embodiment.

The technique of the present invention in accordance with the above two embodiments provides the image processing for one image file. It is also available to perform the uniform image processing that allows the additional data to be added or canceled on or from a plurality of image files. FIG. 13 is a flowchart illustrating the process of generating the image file 100 in the DSC 12 in accordance with the third embodiment.

The control circuit 124 inputs the plurality of image files (step S300) and selects a target image file to be processed (step S310). The user may independently specify the image file. The image file may also be specified based on pieces of information, such as the shooting condition and the date of photographing, that meets selection condition, which is specified by the user. For example, the user may select images that are taken in a specific shooting mode or on a certain day. When any comment about the image data, such as "an athletic meeting", is provided to the image file, the user may select images based on such a comment. It is also available to select the image file according to the image processing control data included in the image file. For example, the user may select image files, in which "Color Balance" is set to "Low".

Then, the judgment is performed as to whether or not setting the additional data to selected image files, or invalidating the additional data uniformly (step S 320). When the uniform set-up is performed, the additional data is set (step S330). Then, the analysis is performed as to whether or not the image file originally includes the additional data (step S340). When the image file includes the additional data, the image file is generated by overwriting the additional data that has been set at step S350. When the image file includes no additional data, the image file is generated by adding the additional data (step S355). Then the judgment is performed as to whether or not the processing for setting the additional data has been carried out for all of the selected image files (step S360). If not, the operation from steps S340 through S360 are repeated until the image processing is carried out for all image files. If the processing has already been carried out for all image files, the uniform set-up processing is then terminated.

At step S320, when invaliding the data uniformly, the judgment is performed by analyzing whether or not the image file includes the additional data (step S370). When the image file includes any additional data, the additional data is deleted, and the image file, in which the image file and the image processing control data are included, is generated (step S380). Then the judgment is performed as to whether or not the processing for invalidating the additional data has been carried out for all of the selected image files. If not, the operation from steps S370 through S390 is repeated until the processing is carried out for all image files. If the processing has been carried out for all image files, the invalidating processing in a uniform manner is then terminated. When no additional data is included in the image file at step S370, the operation proceeds to step S390 to perform the similar processing.

As described in the third embodiment, the additional data may be added to or canceled from the plurality of image files uniformly regardless of the presence or the absence of the additional data. Accordingly, it enables the image file to be generated more conveniently.

G. Image Output Device

A color printer 20 as an image output device will be discussed below. The color printer 20 is an ink-jet printer that functions to output a color image and form dot patterns by ejecting, for example, color ink consisting of seven color components; cyan (C), light cyan (LC), magenta (M), light magenta (LM), yellow (Y), dark yellow (DY) and black (K), on a printing medium to form the image. A diversity of printers, such as an electro photography printer, which transfers and fixates color toner on the printing medium to form the image, are also applicable.

A control circuit 22 in the color printer 20 functions to read out the image file 100 from the memory card MC that is inserted into a memory card slot 24, analyze the image processing control data and perform the image processing, which will be discussed later, on the image data based on the image processing control data that has been analyzed. Then, the printing is executed.

H. Image Processing on Image Output Device

Figure 14:
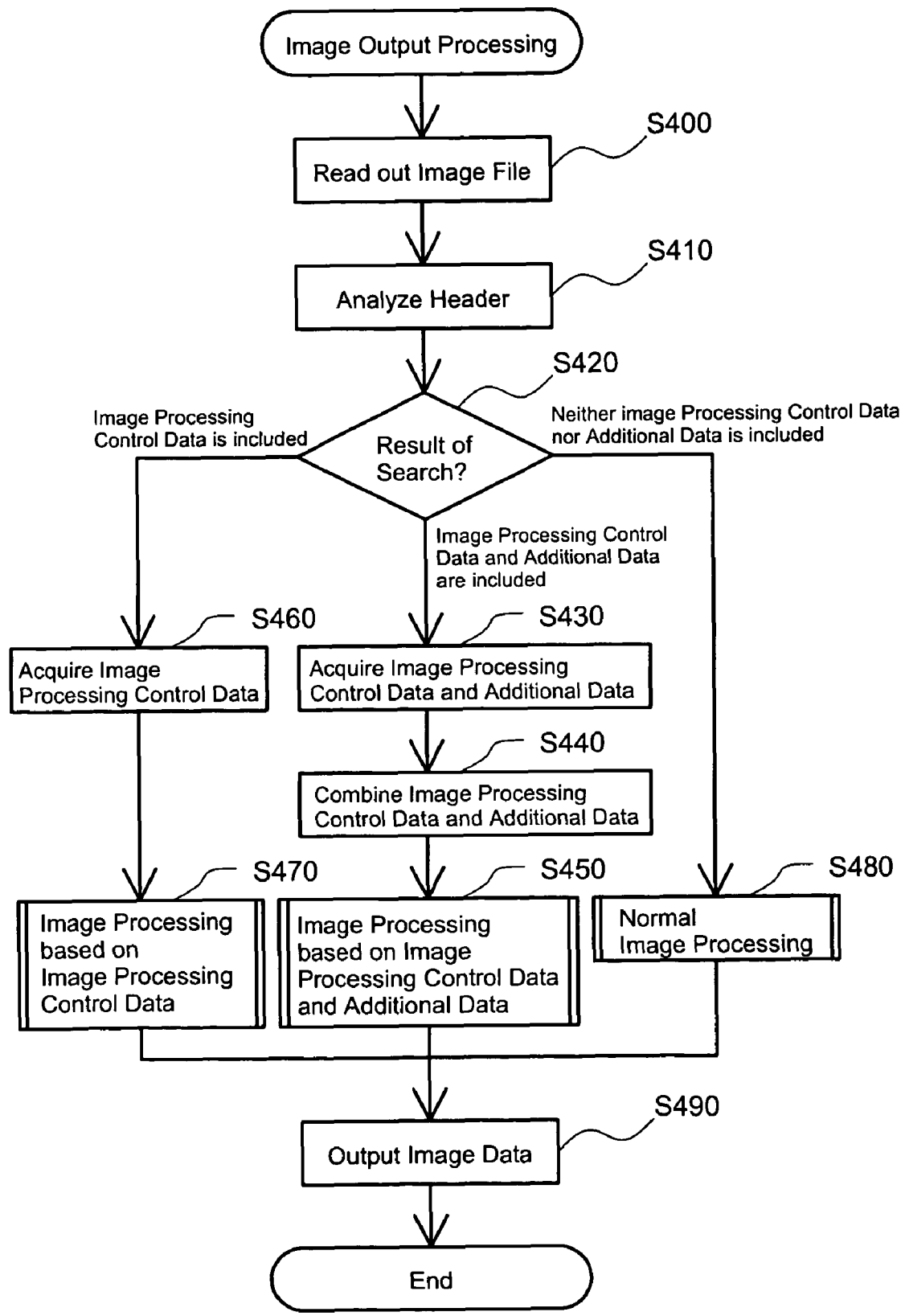
FIG. 14 is a flow chart illustrating an image output processing routine in the color printer 20.

FIG. 14 is a flow chart illustrating image output processing in the color printer 20. Once the memory card MC is inserted into the memory card slot 24, a CPU in the control circuit 22 in the color printer 20 reads out the image file 100 from the memory card MC and temporally stores the read image file 100 into RAM (step S400). Then the CPU analyzes the header of the read image file 100 (step S410), and searches the image processing control data and the additional data (step S420).

When detecting the image processing control data and the additional data, the CPU acquires both data (step S430). The CPU then combines the image processing control data and the additional data that have been acquired in conformity with a specific format (step S440). The CPU subsequently performs the image processing on the image data, based on the image processing control data and the additional data (step S450). When detecting the image processing control data only, the CPU acquires the image processing control data only (step S460), and performs the image processing on the image data according to the acquired data (step S470). When the CPU detect neither image processing control data nor the additional data, the CPU acquires the parameter value, which is stored into the ROM of the color printer 20, and thereby performs the normal image processing on the image data (step S480).

After the image processing on the image data is carried out, the processed image data is printed out (step S490) and this processing routine is then terminated.

Figure 15:
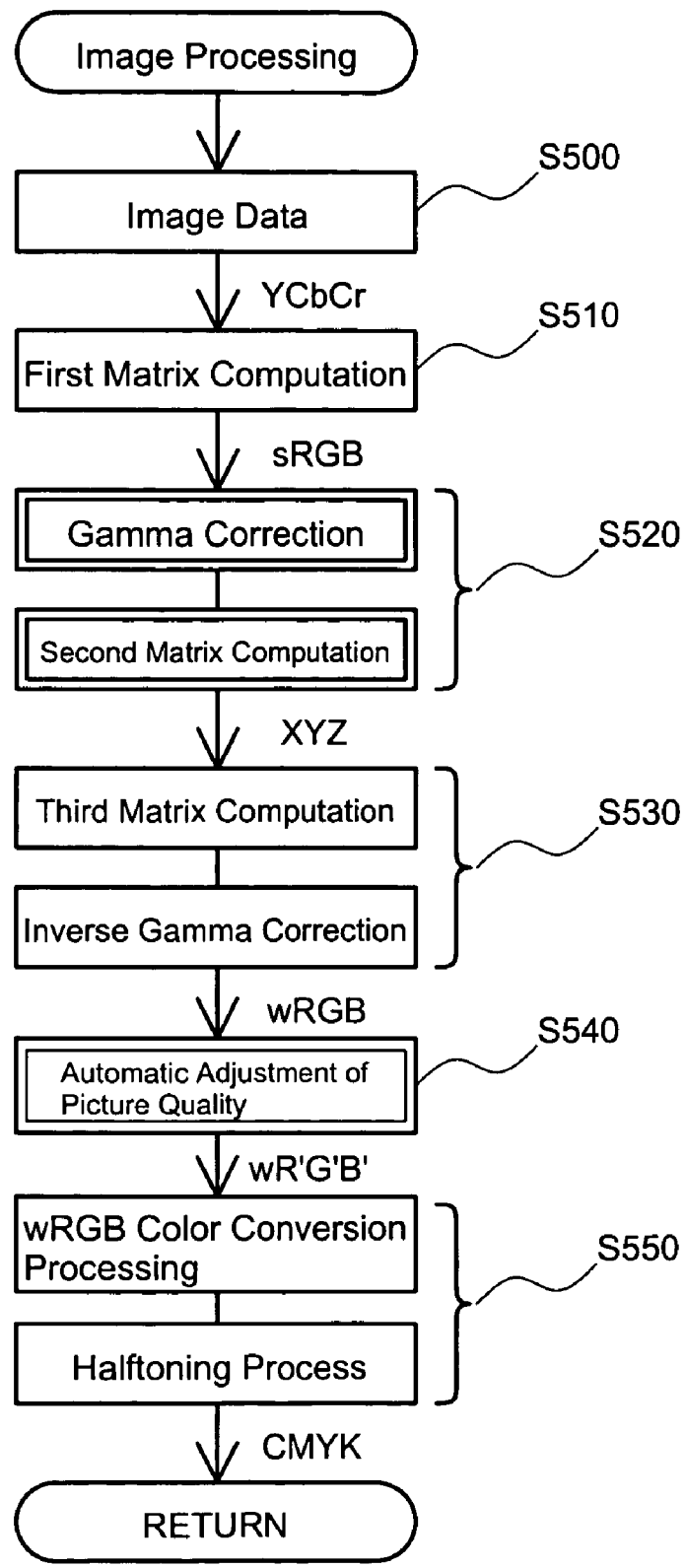
FIG. 15 is a flow chart illustrating a sequence of an image processing based on image processing control data.

FIG. 15 is a flow chart illustrating a sequence of the image processing. FIG. 15 specifically shows the flow of the image processing at step S470. A double line is added to represent the processing where the image processing control data is used. The image processing, based on the image processing control data and the additional data at step S450, is also performed in a similar manner since the additional data is regarded as one application of the image processing control data.

The CPU in the color printer 20 fetches the image data from the read image file 100 (step S500). As described above, the DSC 12 stores the image data into the file of the JPEG format, where the image data is stored with a YCbCr color space to keep high data compression ratio.

The CPU executes a first matrix computation to convert the image data in the YCbCr color space into the image data in a sRGB color space (step S510).

The CPU then carries out a gamma correction and a second matrix computation on the resulting image data in the sRGB color space (step S520). In the process of the gamma correction, the CPU fetches the gamma value on the DSC 12 from the image processing control data, and thereby performs the process of the conversion of the gamma value into the fetched gamma value on the image data. The second matrix computation is applied to convert the image data in the sRGB color space into the image data in the XYZ color space. When the image file 100 includes color space information, the CPU refers to the color space information, and thereby carries out the second matrix computation applying the matrix corresponding to the color space relating to the generation of the image data.

The XYZ color space is applied for the image data after the procedure of the second matrix computation. The color space, used for the image processing with printers or computers, was conventionally fixed in the sRGB color space that prevented effective use of the color space applied for the DSC 12. Contrary to the conventional type, the printer of the present invention utilizes the color space of the DSC 12 to attain desirable color reproduction, and thereby change the matrix, used for the second matrix computation, based on the information regarding the color space, which is included in the image file 100.

The CPU carries out a third matrix computation and an inverse gamma correction to convert the image data in the XYZ color space into the image data in the wRGB color space, and thereby performs the adjustment of the picture quality based on the image processing control data (step S530). The wRGB color space is defined to have the broader color range than the sRGB color space. In the process of the inverse gamma correction, the CPU fetches a default gamma value from ROM in the color printer 20, and thereby performs the process of the inverse gamma conversion on the image data, applying the inverse value of the fetched gamma value. The CPU carries out the third matrix computation applying the matrix included in ROM, which corresponds to the conversion into the wRGB color space.

The wRGB color space is applied after the procedure of the third matrix computation. As described above, the wRGB color space is defined to have the broader color range than the sRGB color space, which corresponds to the color space that is generable by the DSC 12.

The CPU subsequently performs automatic adjustment of the picture quality of the image (step S540). In this embodiment, the CPU acquires each parameter value of the image processing control data (the additional data included), which is included in the image file 100, and thereby performs the automatic adjustment of the picture quality of the image, based on this parameter.

Once the automatic adjustment of the picture quality of the image is carried out, the CPU performs the process of the wRGB color conversion and halftoning for the printing (step S550). In the process of the wRGB color conversion, the CPU refers to a conversion lookup table (LUT) for converting into the CMYK color space that corresponds to the wRGB color space, which is stored into ROM in the CPU, and thereby converts the WRGB color space into the CMYK color space. Namely, the image data with tone values of R, G, B is converted into, for example, the image data with the tone values of seven colors; C, M, Y, K, LC, LM, DY.

In the process of the halftoning, the tone value conversion process is performed on the image data with receipt of the converted image data. In this embodiment, the converted image data is expressed by the data, each of which has 256-tone. On the other hand, the color printer 20 in this embodiment adopts only two statuses; "dot formed" or "dot not formed", which locally enables two scales to be expressed. This process accordingly enables 256-tone of the image data to be converted into two-tone that allows the color printer 20 to express. Any known binarizing method, such as an error diffusion method and a systematic dither method, may be applied for this processing.

In the color printer 20, the process of a resolution conversion is performed prior to the process of the color conversion. When the resolution of the image data is lower than that of the image to be printed out, new data is generated between two neighboring image data with the procedure of liner interpolation. When the resolution of the image data is higher, on the other hand, this process lowers the pixel density at a regular rate, and thereby performs the process of the resolution conversion that converts the resolution of the image data into that of the printing. In addition, the color printer 20 performs an interlace providing process, which sorts data arrangement in order to transfer the image data converted into the format that expresses whether of not the dots are formed.

As mentioned above, the color printer 20 in this embodiment enables the image data in the image file 100, which is generated by the DSC 12, to be subjected to desirable image processing to be output.

Using the image processing control data included in the image file enables the picture quality of the image to be adjusted automatically in accordance with the color printer 20 in this embodiment. In addition, when conditions for adjusting the picture quality of the image data have arbitrarily been set by the user, the automatic adjustment of the image data is performed reflecting the additional data set in arbitrary, and thus sets arbitrary conditions for adjusting an output image, which avoids the problem existing on conventional automatic adjustment function of the picture quality.

Furthermore, the image processing control data and the additional data included in the image file enables the picture quality to be adjusted automatically, and thereby easily attain the printing with high quality on which the shooting intention of the user is reflected without performing the adjustment of the picture quality on a photo retouch application or a printer driver.

Although one example of the above embodiment regards the automatic adjustment of the picture quality, the adjustment process of this embodiment may also be performed on a certain occasion; for example, at the time when the automatic adjustment of the picture quality is selected with a picture quality automatic adjustment button that is installed in an operation panel on the color printer 20.

I. Image Output Device

Fourth Embodiment

The color printer may include the second image processing control data storage module (not shown).

The color printer of the fourth embodiment functions to perform the image processing using the image processing control data included in the image file and the additional data recorded in the color printer.

In accordance with the fourth embodiment, the color printer stores the additional data, and performs the processing, to which the additional data is uniformly added, corresponding to the intention of the user without a personal computer PC, and thereby outputs the processed data. When the additional data is included in the image file, the image processing may be performed, for example, by canceling the additional data uniformly and adding data uniformly to the additional data in the color printer after the cancel.

J. Modifications

All of the diverse series of image processing or part of them discussed in the above embodiment may be executed in a personal computer, or a server SV through a network. Providing the application for image data processing, such as the retouch application and the printer driver, with the image processing function as discussed in FIG. 15, attains the processing on the personal computer PC. The image file 100 generated in the DSC 12 is provided to the computer via the cable or the memory card MC. Upon activating the application on the personal computer by the user operation, the image file 100 is read out, the image processing control data is analyzed, and the image data is converted and adjusted. The series of processing described above may also be performed with the automatic activation of the application in response to detection of the insertion of the memory card MC and the cable.

The image processing on the server SV is attained by installing the application, which executes the image processing function with reference to FIG. 15. The server SV may receive the image file 100, perform the image processing that is specified based on the image processing control data and transmit the processed image file 100 or the image data to the personal computer PC of transmitter or the color printer 20 of destination. One applicable example of printing process without the computer includes the transmission of a global IP address of the color printer 20 and the image file from the DSC 12, which has a wireless communication facility, to the server SV, and the transmission of the processed image file 100 or the image data from the server SV corresponding to the transmitted global IP address in return.

It is also available to select a parameter for executing the automatic adjustment of the picture quality. For example, the color printer 20 may equip a parameter select button or a shooting mode parameter select button for selecting the shooting mode, in which specific set of parameters are preset suitable for the object of the shoot. Alternatively, the parameter for performing the automatic adjustment of the picture quality on the user interface, such as the printer driver or the retouch application, may be selected where the automatic adjustment of the picture quality is performed on the personal computer.

Although the color printer 20 is used as the output device in a sequence of the above-mentioned embodiments, a display device, such as a CRT, a LCD and a projector, may also be utilized. In this case, an image processing program, which executes the image processing as discussed with reference to FIGS. 14 and 15, is performed on the display device as the output device. For example, when the CRT or the like functions as the display device on the computer, the image processing program is executed on the computer. It should be understood that final output image data has the format not in the CMYK color space but in the RGB color space.

In this case, user preference relating to the generation of the image data may be reflected on the displayed image on the display device, such as the CRT, in the similar manner of reflecting the user preference relating to the generation of the image data on the printing result with the color printer 20.

In one available example, the image file 100 used in this embodiment is employed as the image file in capturing specific frame of the digital television broadcast, since such image data is in the format based on the YCbCr color space, and thus is applicable to this invention similar to the case of the DSC 12. To be more precise, the image file 100, in which the image data and the image processing control data is included, is generated by acquiring the scene to which the capture is instructed and setting the image processing control data corresponding to the acquired image data. As a result, the image with high saturation may be output in the case of the output of the image data, similar to the output of the color in the digital television broadcast.

Embodiments of the present invention described herein have been primarily directed toward the image file generation apparatus, the image output device, the image output system and the program; however, the above embodiment and its modifications are to be considered in all aspects as illustrative and not restrictive. There may be many modifications, changes, and alterations without departing from the scope or spirit of the main characteristics of the present invention.

Although parameters used in those embodiments as the image processing control data are, for example, the gamma value, the color space, the brightness and the sharpness, any parameter may be arbitrary used as the image processing control data.

In addition, respective parameters shown in FIG. 9 are to be considered as illustrative and not restrictive, and the invention is not to be limited to those values given herein. Furthermore, although any matrix value of the image processing in FIG. 15 has not been illustrated, it should be understood that those values may be changed depending on conditions, such as the color space to be targeted or the color space available for the color printer 20. It is also applicable to use the additional data of matrix since each element of the matrix is one of the image processing control data that influences on the image to be output.

The DSC 12 has been discussed as the image file generation apparatus, however, a diversity of devices, such as a scanner and a video camera, may also be used. In the case of using the scanner, data information for acquiring the image file 100 may be selected on the computer PC, or may be selected on the scanner independently, using a preset button on the scanner, in which set-up information is allocated previously for setting information, and using a display screen and a set-up button on the scanner to be set arbitrarily.

The file in the Exif format has been discussed as the example of the image file 100 in the embodiment, however, the invention is not to be limited to the format given herein. The available image file includes the image data generated by the image data generation apparatus and the image processing control data that describes conditions for the output of the image data. Such a file requires no set-up regarding the condition of the image processing on the output device for each printing, and thereby immediately performs the image processing based on the specified condition regarding the image processing, so that the image data, which is generated by the image file generation apparatus, can be output from the output device after the automatic adjustment of the picture quality is performed adequately.

INDUSTRIAL APPLICABILITY

The present invention may be applied for generation of an image file, in which image data and image processing control data are associated one another, and image processing on a resulting image file.

The invention claimed is:

1. An image file generation apparatus comprising:
    an image data generation module that generates image data;
    a first image processing control data storage module that stores first image processing control data, wherein the first image processing control data is preset, unable to be edited by a user, and configurable in accordance with a shooting mode of the image data;
    a second image processing control data storage module that stores second image processing control data, wherein the second image processing control data is configurable by the user;
    an image processing control data acquisition module that acquires the first image processing control data from the first image processing control data storage module, and the second image processing control data from the second image processing control data storage module;
    an integrating module that integrates the acquired first and second image processing control data into image processing control data; and
    an image file generation module that generates an image file including the image data and the integrated image processing control data,
    wherein the integrated image processing control data in the image file specifies image processing which is to be performed on the image data when reproducing, and
    wherein the integrating module includes:
        a first adapting module that, when parameters of the acquired first and second image processing control data indicate a same value, adapts the same value for the image processing control data; and
        a second adapting module that, when parameters of the acquired first and second image processing control data indicate different values, adapts one value other than a default value for the image processing control data.

2. An image file generation apparatus in accordance with claim 1,
    wherein the second image processing control data storage module stores a plurality of the second image processing control data that correspond to a plurality of image output devices being capable of utilizing the image processing control data.

3. An image file generation method comprising:
    generating image data;
    storing first image processing control data in a first storage, wherein the first image processing control data is preset, unable to be edited by a user, and configurable in accordance with a shooting mode of the image data;
    storing second image processing control data in a second storage, wherein the second image processing control data is configurable by the user;
    acquiring the first image processing control data from the first storage and the second image processing control data from the second storage;
    integrating the acquired first and second image processing control data into image processing control data; and
    generating an image file including the image data and the integrated image processing control data, wherein the integrated image processing control data in the image file specifies image processing which is to be performed on the image data when reproducing, and wherein the integrating of the acquired first and second image processing control data into image processing control data includes, when parameters of the acquired first and second image processing control data indicate a same value, adapting the same value for the image processing control data, and, when parameters of the acquired first and second image processing control data indicate different values, adapting one value other than a default value for the image processing control data.

4. A computer-readable recording medium in which a computer program is recorded, the computer program causing a computer to attain the functions of:
    generating image data;
    storing first image processing control data in a first storage, wherein the first image processing control data is preset, unable to be edited by a user, and configurable in accordance with a shooting mode of the image data;
    storing second image processing control data in a second storage, wherein the second image processing control data is configurable by the user;
    acquiring the first image processing control data from the first storage and the second image processing control data from the second storage;
    integrating the acquired first and second image processing control data into image processing control data; and generating an image file including the image data and the integrated image processing control data, wherein the integrated image processing control data in the image file specifies image processing which is to be performed on the image data when reproducing, and wherein the integrating of the acquired first and second image processing control data into image processing control data includes, when parameters of the acquired first and second image processing control data indicate a same value, adapting the same value for the image processing control data, and, when parameters of the acquired first and second image processing control data indicate different values, adapting one value other than a default value for the image processing control data.

* * * * *